US008830938B2

(12) United States Patent
Wang et al.

(10) Patent No.: US 8,830,938 B2
(45) Date of Patent: Sep. 9, 2014

(54) BASE STATION APPARATUS AND COMMUNICATION TERMINAL

(75) Inventors: Xiaoqiu Wang, Fujimino (JP); Noriaki Miyazaki, Fujimino (JP); Satoshi Konishi, Fujimino (JP)

(73) Assignee: KDDI Corporation, Tokyo (JP)

( * ) Notice: Subject to any disclaimer, the term of this patent is extended or adjusted under 35 U.S.C. 154(b) by 26 days.

(21) Appl. No.: 13/408,176

(22) Filed: Feb. 29, 2012

(65) Prior Publication Data
US 2012/0250638 A1    Oct. 4, 2012

(30) Foreign Application Priority Data

Mar. 31, 2011 (JP) .................................. 2011-078383

(51) Int. Cl.
*H04W 4/00* (2009.01)
*H04W 28/04* (2009.01)

(52) U.S. Cl.
CPC .................................... *H04W 28/04* (2013.01)
USPC ........................................................ 370/329

(58) Field of Classification Search
CPC .................................................... H04W 28/04
USPC .......... 370/235, 280–283, 328–329, 344–348
See application file for complete search history.

(56) References Cited

U.S. PATENT DOCUMENTS

| 2010/0005355 | A1* | 1/2010 | Niu et al. ....................... 714/749 |
| 2010/0070815 | A1  | 3/2010 | Papasakellariou et al. |
| 2010/0075690 | A1  | 3/2010 | Wu |
| 2010/0085927 | A1* | 4/2010 | Torsner et al. ................ 370/329 |
| 2010/0202382 | A1* | 8/2010 | Park et al. ..................... 370/329 |
| 2011/0032889 | A1* | 2/2011 | Lee et al. ...................... 370/329 |
| 2011/0128896 | A1* | 6/2011 | Huang et al. .................. 370/280 |

(Continued)

FOREIGN PATENT DOCUMENTS

| JP | 2010-532962 A | 10/2010 |
| WO | 2009/025525 A1 | 2/2009 |
| WO | 2010/031470 A1 | 3/2010 |

OTHER PUBLICATIONS

3GPP TS 36.211 V9.1.0, 3rd Generation Partnership Project; Technical Specification Group Radio Access Network; Evolved Universal Terrestrial Radio Access (E-UTRA); Physical Channels and Modulation (Release 9), pp. 54-57, Mar. 2010.

(Continued)

*Primary Examiner* — Andrew Chriss
*Assistant Examiner* — Peter Mak
(74) *Attorney, Agent, or Firm* — Morgan, Lewis & Bockius LLP

(57) ABSTRACT

Provided is a base station apparatus that employs a dynamic scheduler mode which performs wireless resource allocation for each subframe and applies a result of the allocation to the corresponding subframe, or a continuous transmission scheduler mode which performs wireless resource allocation for each subframe appearing periodically based on a period P and applies a result of the allocation for the relevant subframe to P continuous subframes from a subframe n to a subframe n+P−1. The base station apparatus includes a terminal communication device that communicates continuous transmission application ON/OFF information, which indicates whether or not the continuous transmission scheduler mode is employed, and continuous transmission period information, which indicates a period of continuous transmission scheduling according to the continuous transmission scheduler mode, to a terminal. The terminal communication device may store the continuous transmission application ON/OFF information and the continuous transmission period information in a PDCCH region.

8 Claims, 10 Drawing Sheets

(56) References Cited

U.S. PATENT DOCUMENTS

2011/0200020 A1* 8/2011 Xu et al. ............. 370/336
2012/0094661 A1* 4/2012 Frenger et al. ....... 455/434
2012/0120908 A1* 5/2012 Ahn et al. ........... 370/329

OTHER PUBLICATIONS

3GPP TS 36.213 V9.1.0, 3rd Generation Partnership Project; Technical Specification Group Radio Access Network; Evolved Universal Terrestrial Radio Access (E-UTRA); Physical layer procedures (Release 9), pp. 66-69, Mar. 2010.

Office Action dated Feb. 18, 2014, issued by the Japanese Patent Office in Japanese Patent Application No. 2011-078383.

Office Action dated Feb. 19, 2014, issued by the German Patent & Trademark Office in German Patent Application No. 102012006364.4.

* cited by examiner

FIG. 4

TYPES OF PDCCH

- DCI format 0
  – to communicate allocation result of PUSCH to UE
- DCI format 1
  – to communicate allocation result of one PDSCH codeword to UE
- DCI format 1A
  – one PDSCH codeword and random access procedure initiated by a PDCCH order
- DCI format 1B
  – one PDSCH codeword with precoding information
- DCI format 1C
  – one PDSCH codeword and notifying MCCH change
- DCI format 1D
  – one PDSCH codeword with precoding and power offset information
- DCI format 2/2A/2B
  – PDSCH
- DCI format 3/3A
  – PUCCH/PUSCH for TPC

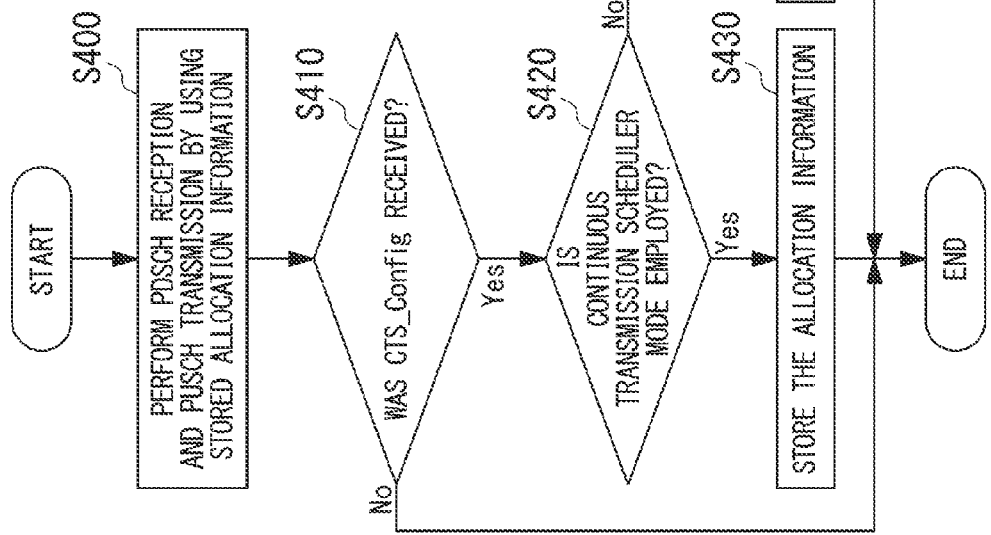
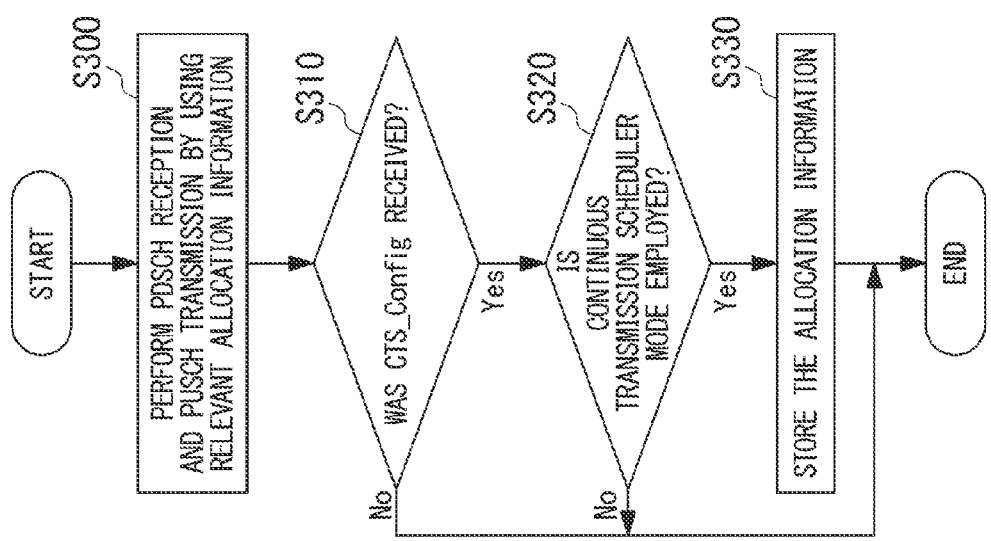

BASE STATION APPARATUS AND COMMUNICATION TERMINAL

BACKGROUND OF THE INVENTION

1. Field of the Invention

The present invention relates to a base station apparatus and a communication terminal.

Priority is claimed on Japanese Patent Application No. 2011-078383, filed Mar. 31, 2011, the contents of which are incorporated herein by reference.

2. Description of the Related Art

Currently, a standardization group for wireless interfaces such as 3GPP (third generation partnership project) aims to further improve the efficiency of frequency usage for third-generation systems such as W-CDMA (wideband code division multiple access), and thus advances standardization of successor systems (represented by LTE (long term evolution)) beyond the third generation.

In the wireless access system of LTE, OFDMA (orthogonal frequency division multiple access) is used for downlinks (i.e., data communication links from a base station to mobile stations). In OFDMA, a system band width is divided into multiple subcarrier units. In each subcarrier unit, a data channel is allocated to an individual terminal (i.e., mobile terminal called "UE"). Additionally, the configuration of the subcarrier units, and each terminal for the allocation, can be changed as time passes. Therefore, in an OFDMA system, allocation of physical channels can be flexibly performed by using two-dimensional wireless resources including frequency and temporal (time) components.

In LTE, information about temporally-variable data channel allocation for upstream and downstream links (i.e., uplinks and downlinks) is communicated to each terminal by using a downstream control channel called "PDCCH" (physical downlink control channel). In a downstream subframe (of LTE), whose data amount is computed by "14 OFDM symbols×the number of subcarriers included in the relevant band, a PDCCH and a PDSCH (physical downlink shared channel) are time-division multiplexed as shown in FIG. 9. A PDCCH region for PDCCH occupies 3 OFDM symbols or less measured from the head OFDM symbol, where the occupied size is not fixed. Therefore, in an LTE downlink, PCFICH (physical control format indicator channel) is used for informing each terminal of the number of OFDM symbols occupied as the PDCCH region, that is, information about the number of OFDM symbols required for PDCCH (see, for example, Non-Patent Documents 1 and 2).

Non-Patent Document 1: 3GPP TS 36.211 v9.1.0, "Evolved Universal Terrestrial Radio Access (E-UTRA); Physical Channels and Modulation (Release 9)", pp. 54-57, March 2010

Non-Patent Document 2: 3GPP TS 36.213 v9.1.0, "Evolved Universal Terrestrial Radio Access (E-UTRA); Physical layer procedures (Release 9)", pp. 66-69, March 2010

Below, a PDSCH receiving procedure and a PUSCH (physical uplink shared channel) sending procedure, which are executed by a terminal, will be explained.

Step 1: PCFICH is received for each subframe, so as to obtain the information about the number of OFDM symbols required for PDCCH.

Step 2: PDCCH addressed to the present terminal is received (i.e., deciphered) using the information about the number of OFDM symbols for PDCCH, which was obtained in Step 1, so as to determine whether or not there is PDSCH/PUSCH allocation information assigned to the present terminal. If such allocation information assigned to the present terminal exists, it is contained (arranged) in a predetermined area (measured using the number of OFDM symbols for PDCCH and identification information (UEid) for identifying the relevant terminal) in the PDCCH region.

Step 3: If it is determined in Step 2 that there is allocation information assigned to the present terminal, the allocation information is obtained, and reception of PDSCH and transmission of PUSCH are performed using the allocation information. If it is determined that there is no allocation information assigned to the present terminal, Step 3 is not executed.

However, the above-described conventional technique has the following problems 1 and 2.

Problem 1: This problem is degradation in reception quality of the control channel (PDCCH) when area extension is performed from a macro base station and a local base station (having lower transmission power than the macro base station). More specifically, there are problems for degradation in reception quality, as shown in an interference scenario A (see the left in FIG. 10) and an interference scenario B (see the right in FIG. 10).

Here, in case of PDSCH, relevant information is stored in a region selected within a PDSCH region so as to avoid interference. However, in case of PDCCH, relevant information is stored in a predetermined area (see the above Step 2), thereby easily receiving an interference effect from a base station (called an "interference-causing base station").

Interference scenario A: A local base station (i.e., "CSG (closed subscriber group) station" which may be called a "CSG Home eNB" in this scenario A) permits an already-registered terminal (which has been registered with the present station and may be called "CSG UE") to access the present station (such an access may be called "open"), and does not permit an unregistered terminal (which has not yet been registered with the present station and may be called "non-CSG UE") to access the present station.

An anticipated problem in this scenario is that the reception quality for a control channel of the non-CSG UE, which is present near the CSG Home eNB, is degraded due to a strong interference from the CSG Home eNB.

That is, in this interference scenario A, the interference-causing base station is the CSG Home eNB, and a terminal (called an "interference-receiving terminal") that receives the interference is the non-CSG UE which is present near the interference-causing base station and connected to a macro base station (called a "Macro eNB").

Interference scenario B: A local base station (i.e., "non-CSG base station" which may be called a "Pico eNB" in this scenario B) in this scenario B does not apply a limitation to terminals which the local base station permits to access the station.

An anticipated problem in this scenario is that the reception quality for a control channel of a terminal (which may be called a "Pico UE" in this scenario), which accesses the Pico eNB in an area expanded by coverage expansion of the Pico eNB, is degraded due to a strong interference from the Macro eNB.

That is, in this interference scenario A, the interference-causing base station is the Macro eNB, and the interference-receiving terminal is the Pico UE which is present in the expanded area and connected to the Pico eNB.

Problem 2: This problem is large battery consumption on the terminal side due to an operation of "PCFICH reception→PDCCH reception→PDSCH reception→PUSCH transmission (if receiving allocation information assigned to the present terminal)" executed for each sub-frame a shown in the above Step 1 to Step 3. This problem does not limitedly relate to a case of area extension from a macro base station and a local base station.

SUMMARY OF THE INVENTION

In light of the above circumstances, an object of the present invention is to provide a technique for improving the reception quality of a control channel of a terminal and reducing the battery consumption of the terminal.

Therefore, the present invention provides a base station apparatus that employs a dynamic scheduler mode which performs wireless resource allocation for each subframe and applies a result of the allocation to the corresponding subframe, or a continuous transmission scheduler mode which performs wireless resource allocation for each subframe appearing periodically based on a period P and applies a result of the allocation for the relevant subframe to P continuous subframes from a subframe n to a subframe n+P−1, wherein the base station apparatus comprises:

a terminal communication device that communicates continuous transmission application. ON/OFF information, which indicates whether or not the continuous transmission scheduler mode is employed, and continuous transmission period information, which indicates a period of continuous transmission scheduling according to the continuous transmission scheduler mode, to a terminal.

In a typical example, the terminal communication device stores the continuous transmission application. ON/OFF information and the continuous transmission period information in a PDCCH region, and communicates these information items to the terminal.

In a preferable example, the terminal communication device communicates the continuous transmission application ON/OFF information and the continuous transmission period information to the terminal by using an RRC (radio resource control) message which contains these information items.

In another preferable example, the terminal communication device communicates the continuous transmission application ON/OFF information and the continuous transmission period information to the terminal by using SIB (system information broadcast) information which contains the continuous transmission application ON/OFF information and the continuous transmission period information.

In another preferable example, the base station apparatus further comprises:

a local base station communication device that communicates the continuous transmission application ON/OFF information and the continuous transmission period information to a local base station which is present in a coverage area of the present base station apparatus, by using an X2 interface.

In another typical example, the base station apparatus further comprises:

a detection device that determines whether or not there is an interference-receiving terminal which is interfered by the present base station apparatus and is present in a predetermined coverage area; and a scheduler mode determination device that sets a scheduler mode to:

the dynamic scheduler mode if there is no interference-receiving terminal in the coverage area; or the continuous transmission scheduler mode if there is the interference-receiving terminal in the coverage area.

The present invention also provides a communication terminal that communicates with a base station apparatus which employs a dynamic scheduler mode which performs wireless resource allocation for each subframe, or a continuous transmission scheduler mode which performs wireless resource allocation for each subframe appearing periodically, wherein the communication terminal comprises:

an application ON/OFF determination device that determines whether or not the continuous transmission scheduler mode is employed, based on continuous transmission application ON/OFF information which indicates whether or not the continuous transmission scheduler mode is employed, where the continuous transmission application ON/OFF information is contained in a PDCCH region; and a transmission and reception device wherein if it is determined that the continuous transmission scheduler mode is employed, the transmission and reception device:

obtains a period P indicated by continuous transmission period information which is contained in the PDCCH region and indicates the period of continuous transmission scheduling according to the continuous transmission scheduler mode; and performs reception of a PDSCH and transmission of a PUSCH for P continuous subframes from a subframe n by using allocation information assigned to the subframe n, where reception of the PDCCH is performed using the subframe n.

The present invention also provides a communication terminal that communicates with a base station apparatus which employs a dynamic scheduler mode which performs wireless resource allocation for each subframe, or a continuous transmission scheduler mode which performs wireless resource allocation for each subframe appearing periodically, wherein the communication terminal comprises:

a reception determination device that determines whether or not an RRC (radio resource control) message has been received, where the RRC message contains continuous transmission application ON/OFF information, which indicates whether or not the continuous transmission scheduler mode is employed, and continuous transmission period information which indicates a period of continuous transmission scheduling according to the continuous transmission scheduler mode;

an application ON/OFF determination device wherein if it is determined that the RRC message has been received, the application ON/OFF determination device determines whether or not the continuous transmission scheduler mode is employed, based on the continuous transmission application ON/OFF information contained in the RRC message; and a transmission and reception device wherein if it is determined that the continuous transmission scheduler mode is employed, the transmission and reception device:

obtains the period P indicated by the continuous transmission period information which contained in the RRC message; and performs reception of a PDSCH and transmission of a PUSCH for P continuous subframes from a subframe n by using allocation information about wireless resource allocation which has been received and assigned to the subframe n.

The present invention also provides a communication terminal that communicates with a base station apparatus which employs a dynamic scheduler mode which performs wireless resource allocation for each subframe, or a continuous transmission scheduler mode which performs wireless resource allocation for each subframe appearing periodically, wherein the communication terminal comprises:

an application ON/OFF determination device that determines whether or not the continuous transmission scheduler mode is employed, based on continuous transmission application ON/OFF information which is contained in SIB (system information broadcast) information and indicates whether or not the continuous transmission scheduler mode is employed; and a transmission and reception device wherein if it is determined that the continuous transmission scheduler mode is employed, the transmission and reception device:

obtains a period P indicated by continuous transmission period information which is contained in the SIB information and indicates the period of continuous transmission scheduling according to the continuous transmission scheduler mode; and performs reception of a PDSCH and transmission of a PUSCH for P continuous subframes from a subframe n by using allocation information about wireless resource allocation which has been received and assigned to the subframe n.

In accordance with the present invention, it is possible to improve the reception quality of a control channel of a terminal and reduce the battery consumption of the terminal.

BRIEF DESCRIPTION OF THE DRAWINGS

FIG. 4 is a list explaining the types of PDCCH.

FIGS. 8A and 8B are flowcharts showing an example of the operation of the access terminal when employing Communication manner 2.

DETAILED DESCRIPTION OF THE INVENTION

Hereinafter, embodiments of the present invention will be described with reference to the appended figures.

Figure 1:
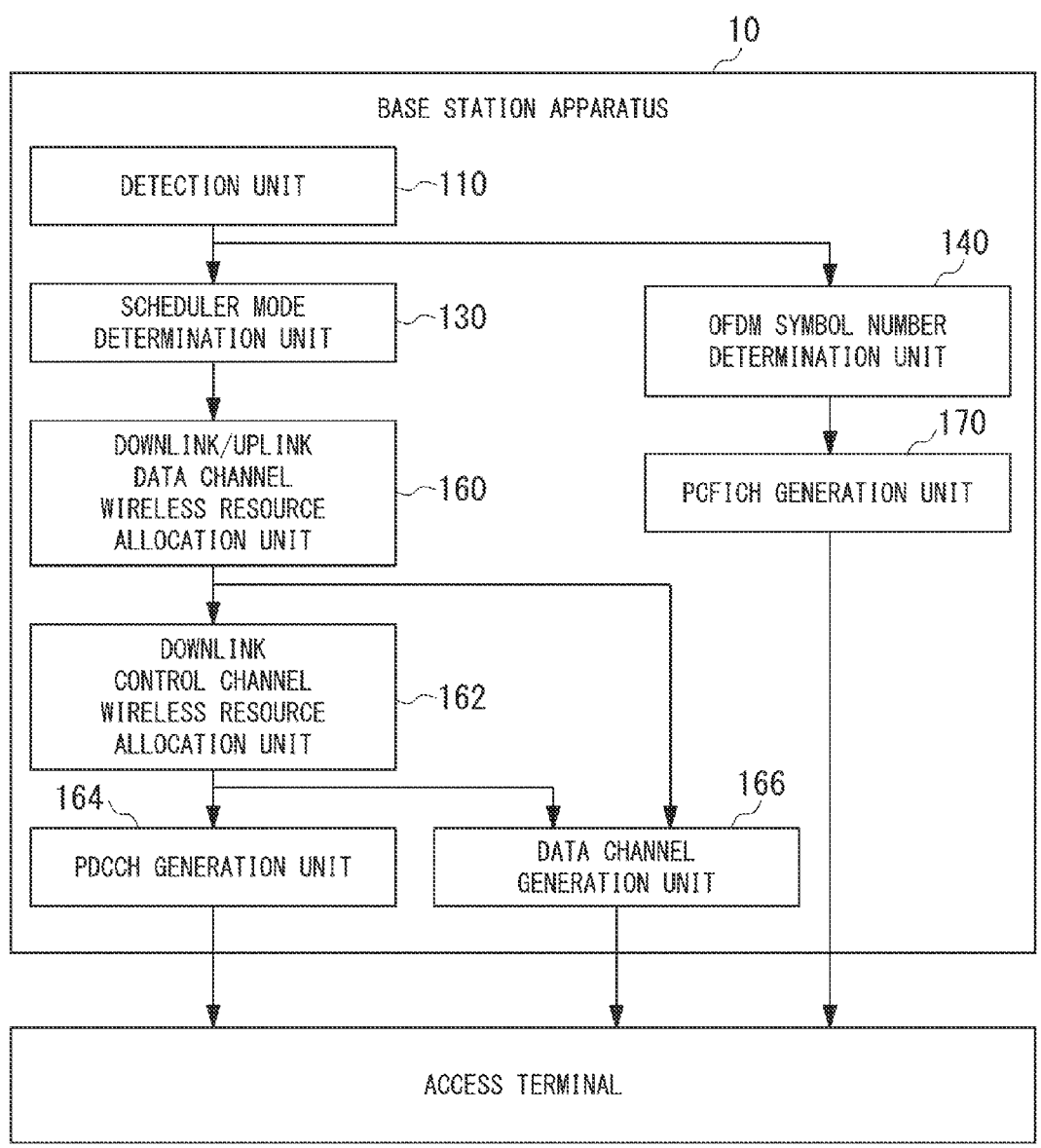
FIG. 1 is a functional block diagram of a base station apparatus 10 as an embodiment of the present invention.

FIG. 1 is a functional block diagram of a base station apparatus 10 as an embodiment of the present invention.

The base station apparatus 10 is provided at the interference-causing base station in the above-described interference scenarios A and B That is, specifically, the base station apparatus 10 is provided at any one of the CSG Home eNB in scenario A and the Macro eNB in scenario B, and may be simply called a "base station 10" below.

As shown in FIG. 1, the base station apparatus 10 has a detection unit 110, a scheduler mode determination unit 130, an OFDM symbol number determination unit 140, a downlink/uplink data channel wireless resource allocation unit 160, a downlink control channel wireless resource allocation unit 162, a PDCCH generation unit 164, a data channel generation unit 166, and a PCFICH generation unit 170.

First, general operations of the downlink/uplink data channel wireless resource allocation unit 160, the downlink control channel wireless resource allocation unit 162, the PDCCH generation unit 164, the data channel generation unit 166, and the PCFICH generation unit 170 (on the latter processing side) will be explained.

Based on a scheduler mode (explained later) communicated from the scheduler mode determination unit 130 and the like, the downlink/uplink data channel wireless resource allocation unit 160 determines wireless resource allocation to a data channel (PDSCH/PUSCH).

Based on the result of the allocation to the data channel (PDSCH/PUSCH), the downlink control channel wireless resource allocation unit 162 determines wireless resource allocation for PDCCH.

Based on the result of the allocation to PDCCH, the PDCCH generation unit 164 generates a PDCCH, and applies it to a predetermined wireless resource.

Based on the result of the allocation to the data channel (PDSCH) and the result of the allocation to PDCCH, the data channel generation unit 166 generates a data channel PDSCH, and applies it to a predetermined wireless resource.

Based on the number of OFDM symbols communicated from the OFDM symbol number determination unit 140, the PCFICH generation unit 170 generates a PCFICH, and applies it to a predetermined wireless resource.

Next, general operations of the detection unit 110, the scheduler mode determination unit 130, and the OFDM symbol number determination unit 140 (on the former processing side) will be explained.

The detection unit 110 determines whether or not there is a terminal (i.e., interference-receiving terminal), which receives interference from the present base station 10, within the coverage area of the present base station 10. Specifically, the interference-receiving terminal is a non-CSG UE (receiving interference from the present base station 10 (CSG Home eNB)) in case of the above interference scenario A, or a Pico UE (receiving interference from the present base station 10 (Macro eNB)) in case of the above interference scenario B.

For example, in case of the interference scenario A, the detection unit 110 detects that (i) the interference-receiving terminal (non-CSG UE) has entered the coverage area of the present base station 10 (from the outside of the coverage area); (ii) the interference-receiving terminal (which belonged to the coverage area of the present base station 10) has still belonged to the coverage area; or (iii) the interference-receiving terminal (which belonged to the coverage area of the present base station 10) has removed from the coverage area. The detection unit 110 communicates a detected result (obtained by the above determination) to the scheduler mode determination unit 130 and the OFDM symbol number determination unit 140.

In case of the interference scenario B, the detection unit 110 detects that (i) the interference-receiving terminal (Pico UE) has entered the coverage area (expanded part obtained by the coverage expansion of Pico eNB) of the present base station 10 (from the outside of the coverage area (expanded part)); (ii) the interference-receiving terminal (which belonged to the coverage area (expanded part) of the present base station 10) has still belonged to the relevant coverage area; or (iii) the interference-receiving terminal (which belonged to the coverage area (expanded part) of the present base station 10) has removed from the relevant coverage area. The detection unit 110 communicates a detected result (obtained by the above determination) to the scheduler mode determination unit 130 and the OFDM symbol number determination unit 140.

The detection unit 110 may obtain the above detected result from the Pico eNB. That is, instead of a detected result obtained by the determination of the detection unit 110 itself, the Pico eNB may detect (i.e., (i) the Pico UE has entered the expanded part from the outside thereof; (ii) the Pico UE (which belonged to the expanded part) has still belonged thereto; or (iii) the Pico UE (which belonged to the expanded part) has removed therefrom), and inform the base station apparatus 10 (i.e., detection unit 110) of the detected result.

The above determination can be performed in various manners. For example, in case of the interference scenario A, the detection unit 110 monitors a handover request with respect to the interference-receiving terminal (non-CSG UE), which is sent from the macro base station (Macro eNB), so as to determines whether or not the interference-receiving terminal (non-CSG UE) is present within the coverage area of the present base station 10 (CSG Home eNB).

More specifically, if the interference-receiving terminal (non-CSG UE) has entered the coverage area of the present base station 10 within the portable information terminal of the macro base station, then the macro base station sends a handover request to the interference-receiving terminal. Accordingly, when receiving a handover request (having power higher than a predetermined threshold) to the interference-receiving terminal from the macro base station during a specific period of time, the detection unit 110 detects that the interference-receiving terminal is present within the coverage area of the present base station 10. In addition, when the interference-receiving terminal moves away from the coverage area of the present base station 10, the handover request sent from the macro base station disappears. Accordingly, when not receiving the handover request (which has been sent from the macro base station) during a specific period of time, the detection unit 110 detects that the interference-receiving terminal has removed from the coverage area of the present base station 10.

The scheduler mode determination unit 130 receives the result of the detection about the interference-receiving terminal from the detection unit 110. When receiving the relevant result, the scheduler mode determination unit 130 determines a scheduler mode of the present base station 10 (a detailed explanation will be provided later). The scheduler mode determination unit 130 communicates the determined scheduler mode to the downlink/uplink data channel wireless resource allocation unit 160.

Below, a method of determining a scheduler mode will be explained.

1. When receiving a detected result which indicates that the interference-receiving terminal is not present within the coverage area of the present base station 10 (in scenario A) or when receiving a detected result which indicates that the interference-receiving terminal is not present within the expanded coverage area (in scenario B)

The scheduler mode determination unit 130 determines the scheduler mode of the present base station 10 to be a dynamic scheduler mode. In the dynamic scheduler mode, wireless resource allocation is executed for all subframes, and allocation results for the respective subframes are applied to these subframes.

When performing dynamic scheduling based on the dynamic scheduler mode, the downlink/uplink data channel wireless resource allocation unit 160 allocates a wireless resource to PDSCH/PUSCH in each subframe for an access terminal (which accesses the present base station 10), based on CQI (channel quality indicator) information which was fed back from the access terminal. Here, the access terminal is a CSG UE which accesses the present base station 10 (CSG Home eNB) in case of interference scenario A, or a Macro UE which accesses the present base station 10 (Macro eNB) in case of interference scenario B.

2. When receiving a detected result which indicates that the interference-receiving terminal is present within the coverage area of the present base station 10 (in scenario A) or when receiving a detected result which indicates that the interference-receiving terminal is present within the expanded coverage area (in scenario B)

The scheduler mode determination unit 130 determines the scheduler mode of the present base station 10 to be a continuous transmission scheduler mode. In the continuous transmission scheduler mode, wireless resource allocation is executed for each subframe appearing at regular intervals of P subframes (i.e., in "period P"), and the allocation result for the subframe appearing in the period P is applied to P continuous subframes from subframe n to subframe n+P−1.

Figure 2:
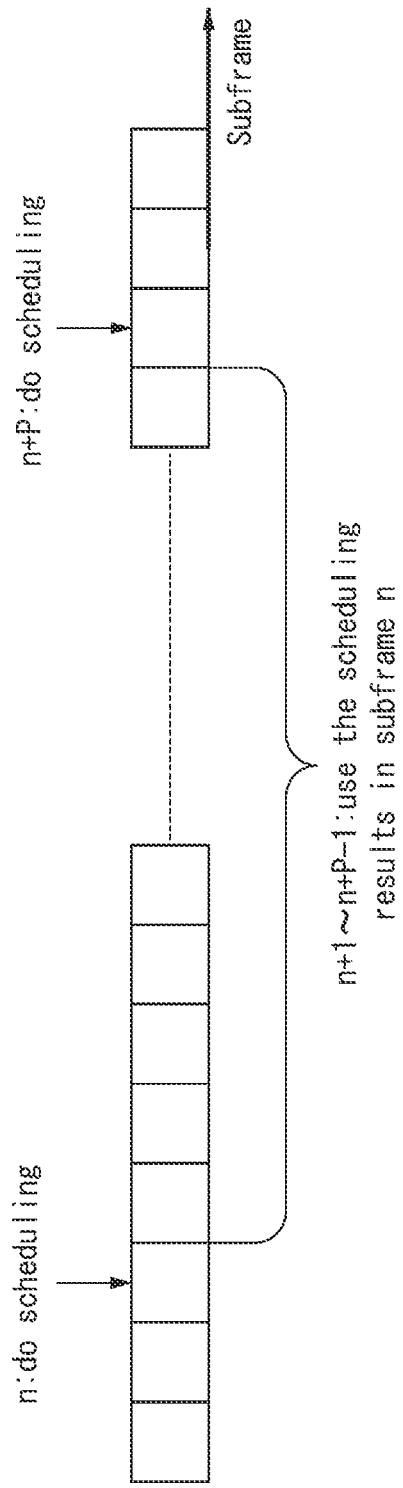
FIG. 2 is a diagram explaining continuous transmission scheduling performed in the continuous transmission scheduler mode.

FIG. 2 is a diagram explaining continuous transmission scheduling performed in the continuous transmission scheduler mode. As shown in FIG. 2, in the continuous transmission scheduling, scheduling based on a predetermined period P is performed so that the allocation result assigned to subframe n is applied to all of P continuous subframes from subframe n to subframe n+P−1. When performing the continuous transmission scheduling, the downlink/uplink data channel wireless resource allocation unit 160 executes the wireless resource allocation (similar to the dynamic scheduling) for subframe n (similarly for subframe n+P, subframe n+2P, . . . ) while no wireless resource allocation is performed for P−1 continuous subframes from subframe n+1 to subframe n+P−1

That is, when the continuous transmission scheduler mode is employed, the base station apparatus 10 must perform PCFICH transmission and PDCCH transmission for subframe n (similarly for subframe n+P, subframe n+2P, . . . ) while the PCFICH and PDCCH transmissions are unnecessary for P−1 continuous subframes from subframe n+1 to subframe n+P−1. In addition, the access terminal performs PDSCH reception and PUSCH transmission for P continuous subframes from subframe n to subframe n+P−1 by using the result of the wireless resource allocation, which is communicated using PDCCH of subframe n. Therefore, PCFICH reception and PDCCH reception are unnecessary for P−1 continuous subframes from subframe n+1 to subframe n+P−1.

Additionally, the base station apparatus 10 must inform the access terminal of (i) information (called "continuous transmission application ON/OFF information" or "continuous transmission scheduler ON/OFF flag" below) which indicates the presence or absence (ON/OFF) of application (employment) of the continuous transmission scheduler mode, and (ii) information (called "continuous transmission period information" below) which indicates the period of the continuous transmission scheduling based on the continuous transmission scheduler mode. The continuous transmission application ON/OFF information and the continuous transmission period information may be communicated using any of a variety of manners (explained later).

The OFDM symbol number determination unit 140 receives the result of the detection for the interference-receiving terminal from the detection unit 110. When receiving the relevant detection result, the OFDM symbol number determination unit 140 determines the number of OFDM symbols applied to PDCCH for the present base station 10, based on the detection result. The OFDM symbol number determination unit 140 communicates the determined number of OFDM symbols to the PCFICH generation unit 170.

Below, a method of determining the number of OFDM symbols applied to PDCCH will be explained.

1. When receiving a detected result which indicates that the interference-receiving terminal is not present within the coverage area of the present base station 10 (in scenario A) or when receiving a detected result which indicates that the interference-receiving terminal is not present within the expanded coverage area of the Pico eNB (in scenario B)

Since the dynamic scheduler mode is employed in this case, the OFDM symbol number determination unit 140 always sets the number of OFDM symbols to a value other than 0. Accordingly, the PCFICH generation unit 170 sends PCFICH for each subframe.

2. When receiving a detected result which indicates that the interference-receiving terminal is present within the coverage area of the present base station 10 (in scenario A) or when receiving a detected result which indicates that the interference-receiving terminal is present within the expanded coverage area of the Pico eNB (in scenario B)

Similar to the above case 1, the OFDM symbol number determination unit 140 always sets the number of OFDM symbols to a value other than 0.

As described above, when interference in the interference-receiving terminal may be anticipated, the base station apparatus 10 sets the scheduler mode to the continuous transmission scheduler mode, thereby improving the reception quality of the control channel for the interference-receiving terminal. In addition, since the access terminal does not perform the PCFICH reception and the PDCCH reception while obeying the continuous transmission scheduling, it is possible to reduce the battery consumption in the interference-receiving terminal.

More specifically, in case of the interference scenario A, the interference-receiving terminal (non-CSG UE) is present in the coverage area of the present base station 10 (CSG Home eNB). Therefore, even when the wireless resource allocation of the control channels (such as PCFICH and PDCCH) for the present base station 10 (CSG Home eNB) overlaps with the wireless resource allocation of the control channels (such as PCFICH and PDCCH) for the macro base station, the reception quality of the control channels (such as PCFICH and PDCCH) at the interference-receiving terminal (non-CSG UE), which belongs to the coverage area of the present base station 10 (CSG Home eNB), from the macro base station can be improved, because actually, the transmission from the present base station 10 (CSG Home eNB) using the control channels (such as PCFICH and PDCCH) is performed only periodically in the continuous transmission scheduler mode. In addition, since the access terminal (CSG UE) which accesses the present base station 10 (CSG Home eNB) performs the PCFICH reception and the PDCCH reception at each subframe appearing at regular intervals of the period P, the battery consumption in this case is reduced in comparison with a case in which the PCFICH reception and the PDCCH reception are performed at each subframe.

On the other hand, in case of the interference scenario B, the interference-receiving terminal (Pico UE) is present in the expanded coverage area of the Pico eNB. Therefore, even when the wireless resource allocation of the control channels (such as PCFICH and PDCCH) for the present base station 10 (Macro eNB) overlaps with the wireless resource allocation of the control channels (such as PCFICH and PDCCH) for the Pico eNB, the reception quality of the control channels (such as PCFICH and PDCCH) at the interference-receiving terminal (Pico UE), which belongs to the expanded coverage area of the present base station 10 (CSG Home eNB), from the Pico eNB can be improved, because actually, the transmission from the present base station 10 (Macro eNB) using the control channels (such as PCFICH and PDCCH) is performed only periodically in the continuous transmission scheduler mode. In addition, since the access terminal (Macro UE) which accesses the present base station 10 (Macro eNB) performs the PCFICH reception and the PDCCH reception at each subframe appearing at regular intervals of the period P, the battery consumption in this case is reduced in comparison with a case in which the PCFICH reception and the PDCCH reception are performed at each subframe.

After determining the scheduler mode, the scheduler mode determination unit 130 may switch the scheduler mode regularly so as to revise the wireless resource allocation. Instead of or in addition to such regular switching, the scheduler mode determination unit 130 may switch the scheduler mode in an event-driven manner. When switching the scheduler mode regularly or in an event-driven manner, even if (i) the interference-receiving terminal, (non-CSG UE) stays in the coverage area of the present base station 10 (CSG Home eNB) for a long time in the interference scenario A, or (ii) the interference-receiving terminal (Pico UE) stays in the expanded coverage area of the Pico eNB for a long time in the interference scenario B, the scheduler mode can be switched to the dynamic scheduler mode regularly. Therefore, the wireless resource allocation can be appropriately revised without awaiting the next timing in the period of the continuous transmission scheduling.

Below, the operation of the base station apparatus 10 will be explained.

Figure 3A:
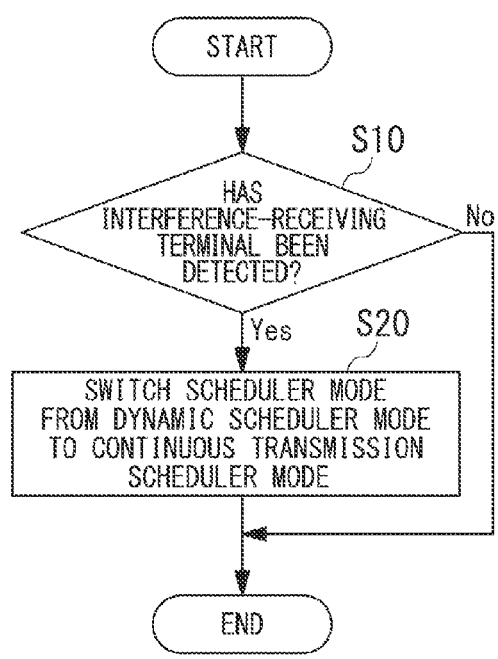
FIGS. 3A and 3B are flowcharts showing an example of the operation of the base station apparatus 10.
Figure 3B:
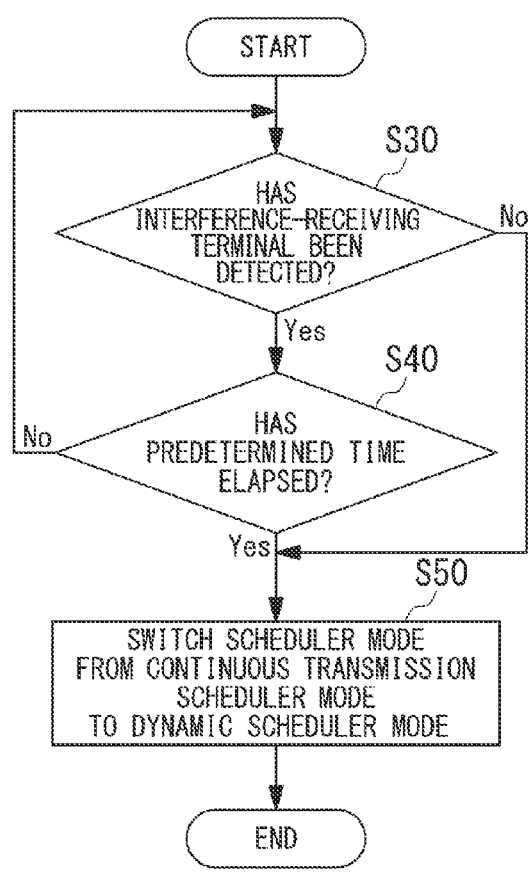

FIGS. 3A and 3B are flowcharts showing an example of the operation of the base station apparatus 10. Specifically, the flowchart in FIG. 3A shows an operation of switching the scheduler mode from the dynamic scheduler mode to the continuous transmission scheduler mode, while the flowchart in FIG. 3B shows an operation of switching the scheduler mode from the continuous transmission scheduler mode to the dynamic scheduler mode.

In FIG. 3A, the detection unit 110 determines whether or not an interference-receiving terminal is present in a predetermined area (see step S10). The predetermined area is the coverage area of the present base station 10 (CSG Home eNB) in the interference scenario A, or the expanded coverage area of the Pico eNB in the interference scenario B. This condition is similarly applied to FIG. 3B.

If it is determined in step S10 that no interference-receiving terminal is present in the predetermined area (see step S10: No), that is, it is determined by the detection unit 110 that no interference-receiving terminal is present in the coverage area of the present base station 10 (interference scenario A) or in the expanded coverage area of the Pico eNB (interference scenario B), then step S20 is skipped and the operation in the flowchart of FIG. 3A is terminated. Accordingly, the scheduler mode determination unit 130 maintains the dynamic scheduler mode.

In contrast, if it is determined in step S10 that an interference-receiving terminal is present in the predetermined area (see step S10: Yes), that is, if it is determined by the detection unit 110 that (i) an interference-receiving terminal (non-CSG UE) is present in the coverage area of the present base station 10 (CSG Home eNB) in case of the interference scenario A, or an interference-receiving terminal (Pico UE) is present in the expanded coverage area of the Pico eNB in case of the interference scenario B, then the scheduler mode determination unit 130 determines the scheduler mode to be the continuous transmission scheduler mode (see step S20). That is, the scheduler mode determination unit 130 switches the scheduler mode from the dynamic scheduler mode to the continuous transmission scheduler mode. The operation in the flowchart of FIG. 3A is completed.

In step S30 of FIG. 3B, the detection unit 110 determines whether or not an interference-receiving terminal is present in a predetermined area, similar to the above step S10.

If it is determined in step S30 that an interference-receiving terminal is present in the predetermined area (see step S10: Yes), the scheduler mode determination unit 130 then determines whether or not a predetermined time (corresponding to the above period P) has elapsed from the previous determination of the scheduler mode to be the continuous transmission scheduler mode (see step S40). If it is determined that the predetermined time has not yet elapsed (see step S40: No), steps S30 and S40 are iterated.

In contrast, if it is determined that no interference-receiving terminal is present in the predetermined area (see step S30: No) or that the predetermined time has elapsed (see step S40: Yes), then the scheduler mode determination unit 130 determines the scheduler mode to be the dynamic scheduler mode (see step S50). That is, the scheduler mode determination unit 130 switches the scheduler mode from the continuous transmission scheduler mode to the dynamic scheduler mode. The operation in the flowchart of FIG. 3B is completed.

In the flowchart of FIG. 3B, after the scheduler mode has been determined to the continuous transmission scheduler mode, the scheduler mode determination unit 130 switches the scheduler mode to the dynamic scheduler mode regularly so as to revise the wireless resource allocation (see step S40: Yes, and step S50), or switches the scheduler mode to the dynamic scheduler mode in an event-driven manner (see step S30: No, and step S50).

That is, when a predetermined time has elapsed (see step S40: Yes) or when the necessity of maintaining the continuous transmission scheduler mode has disappeared even before the predetermined time has elapsed (see step S30; No), switching to the dynamic scheduler mode is executed. Therefore, even if (in the interference scenario A) an access terminal (CSG UE) has entered the coverage area of the present base station 10 (CSG Home eNB) by means of the handover or the like (i.e., an access terminal which has newly obtained an "RRC Connected" status belongs to the present base station 10), the wireless resource allocation for the access terminal can be quickly performed. In addition, even if (in the interference scenario B) an access terminal (Macro UE) has entered the coverage area of the present base station 10 (Macro eNB) by means of the handover or the like, the wireless resource allocation for the access terminal can be quickly performed.

As described above, there are the dynamic scheduler mode and the continuous transmission scheduler mode as the scheduler mode. Therefore, the base station apparatus 10 communicates the presence or absence (ON/OFF) of the application of the continuous transmission scheduler mode (ON: the continuous transmission scheduler mode is employed, OFF: the dynamic scheduler mode is employed) to the access terminal by using the continuous transmission application ON/OFF information. In addition, at least when the continuous transmission scheduler mode is employed, it is necessary for the base station apparatus 10 to inform the access terminal of the information which indicates the period of the continuous transmission scheduling by using the continuous transmission period information.

Below, communication of the continuous transmission application ON/OFF information and the continuous transmission period information by the base station apparatus 10 to the access terminal will be explained using the following communication manners 1, 2, and 3 as specific examples.

Communication Manner 1

In this manner, the continuous transmission application ON/OFF information and the continuous transmission period information are stored in PDCCH (region) so as to communicate these information items to the relevant terminal. More specifically, in PDCCH, one bit (called "bit_continuousTransmissionScheduling") is secured as the region assigned to the continuous transmission application ON/OFF information, and a few bits (called "bits_P") are secured as the region assigned to the continuous transmission period information. Here, the names such as "bit_continuousTransmissionScheduling" and "bits_P" are just examples, and other names may be employed. By using the PDCCH (region), the continuous transmission application ON/OFF information and the continuous transmission period information can be communicated to each of respective access terminals.

Specifically, "bit_continuousTransmissionScheduling=0" means that the continuous transmission scheduler mode is not employed (i.e., the continuous transmission scheduler is OFF), and "bit_continuousTransmissionScheduling=1" means that the continuous transmission scheduler mode is employed (i.e., the continuous transmission scheduler is ON). That is, when the continuous transmission scheduling is not performed, the base station apparatus 10 sets bit_continuousTransmissionScheduling in PDCCH to 0. In contrast, when the continuous transmission scheduling is performed, the base station apparatus 10 sets bit_continuousTransmissionScheduling in PDCCH to 1. The access terminal refers to bit_continuousTransmissionScheduling in PDCCH. When the value of the relevant bit is 0, the access terminal determines that the continuous transmission scheduling is not being performed. When the value of the relevant bit is 1, the access terminal determines that the continuous transmission scheduling is being performed.

The number of bits secured in PDCCH is variable depending on how to represent the period of the continuous transmission scheduling. In order to reduce the number of bits secured in PDCCH, the period of the continuous transmission scheduling may be limited to N different periods ($P_1, P_2, \ldots, P_N$) respectively assigned to N predetermined indexes ($I_1, I_2, \ldots, I_N$). When employing N indexes (corresponding to N different periods), log 2(N) bits should be secured as "bits_P" in PDCCH.

That is, in the continuous transmission scheduling which performs the scheduling regularly by using a period ($P_M$) defined by an index ($I_M$), the base station apparatus 10 sets a predefined value, which represents the relevant index ($I_M$), to bits_P in PDCCH. The access terminal refers to bits_P in PDCCH, and obtains the index ($I_M$) based on the value of bits_P, thereby obtaining the period ($P_M$) based on the index ($I_M$). The access terminal may refer to bits_P in PDCCH when the value of bit_continuousTransmissionScheduling in PDCCH is 1.

In Communication manner 1, the PDCCH generation unit 164 or an output unit (not shown) which communicates PDCCH corresponds to a terminal communication device that stores the continuous transmission application ON/OFF information and the continuous transmission period information in a PDCCH region, and communicates these information items to the relevant terminal.

FIG. 4 shows a list explaining the types of PDCCH. As shown in FIG. 4, PDCCH has various types. The base station apparatus 10 may add the region (bit_continuousTransmissionScheduling) for the continuous transmission application ON/OFF information and the region (bits_P) for the continuous transmission period information to the position immediately after the bits defined in DCI format 0, 1, 1A, 1B, 1C, 1D, 2, 2A, or 2B.

Figure 5:
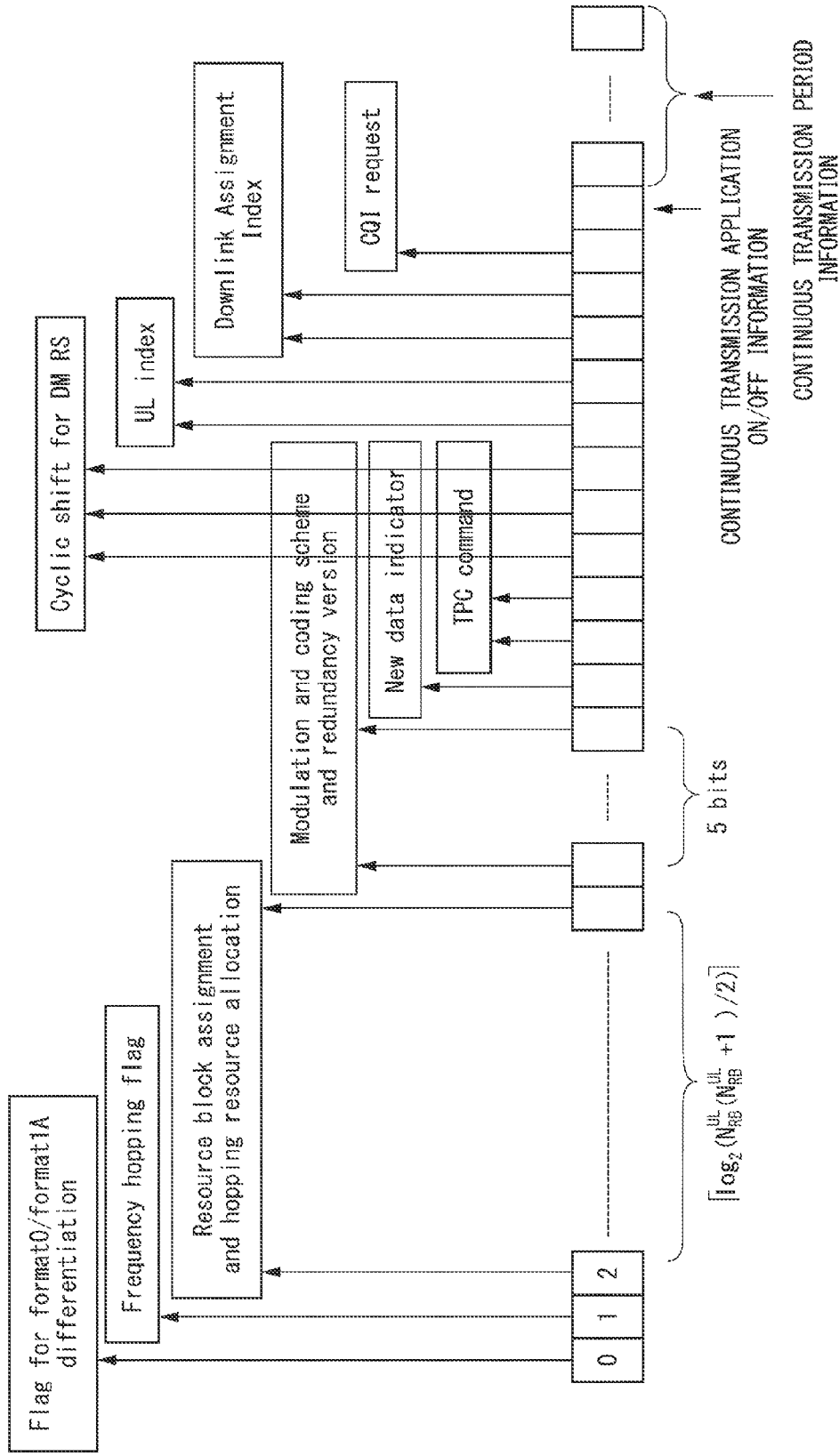
FIG. 5 is a diagram showing an example of DCI format 0 to which the continuous transmission application ON/OFF information and the continuous transmission period information are appended.

FIG. 5 is an example of DCI format 0 to which the continuous transmission application ON/OFF information and the continuous transmission period information are appended. For a 10 MHz band, DCI format 0 requires 29 bits before the above information items are added.

Figure 6:
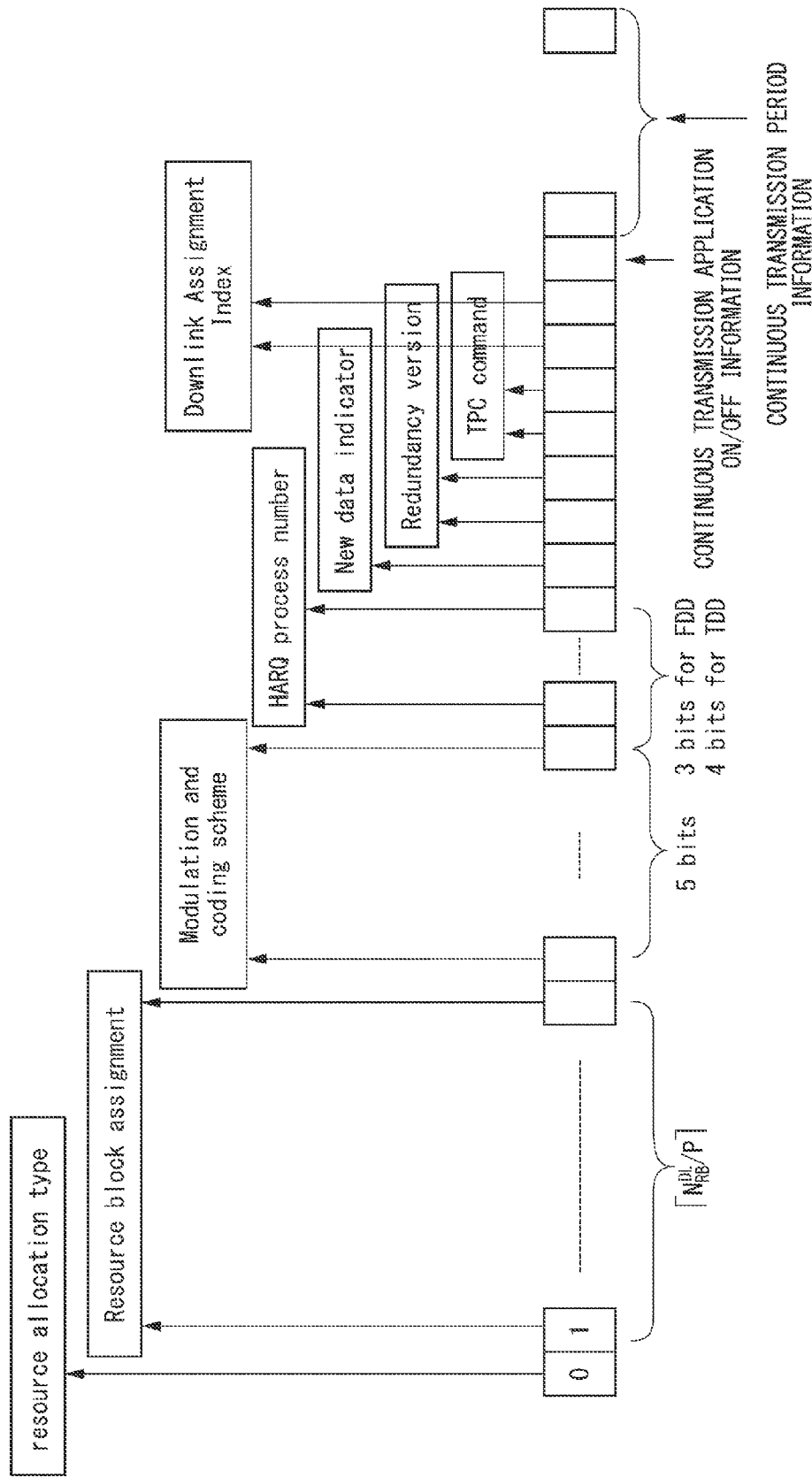
FIG. 6 is a diagram showing an example of DCI format 1 to which the continuous transmission application ON/OFF information and the continuous transmission period information are appended.

FIG. 6 is an example of DCI format 1 to which the continuous transmission application ON/OFF information and the continuous transmission period information are appended. For a 10 MHz band (FDD), DCI format 1 requires 33 bits before the above information items are added. In addition, the first bit "resource allocation type" is omitted when the number of PRBs (physical resource blocks) in the band is 10 or smaller.

Below, the operation of the access terminal when employing Communication manner 1 will be explained.

Figure 7:
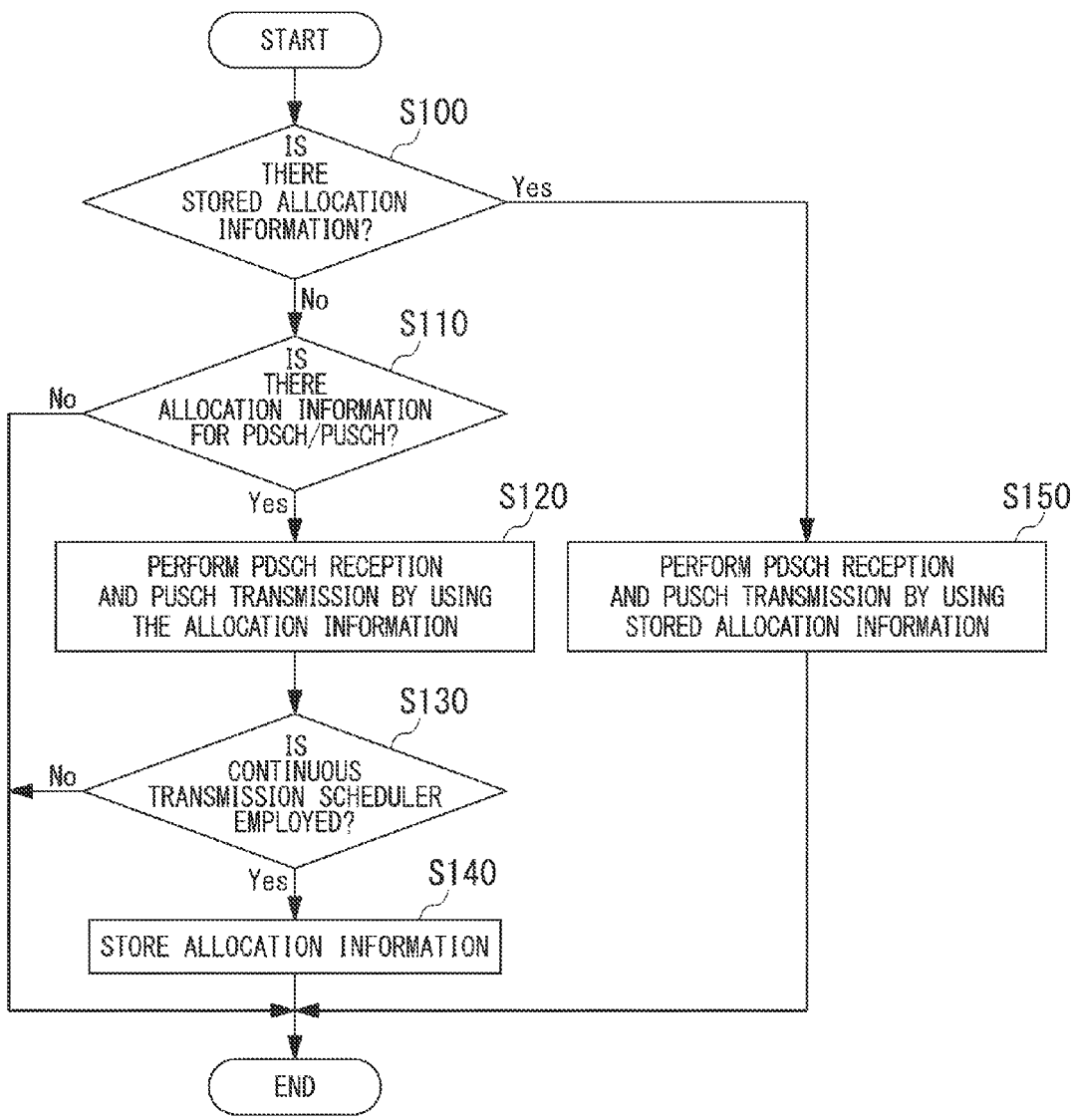
FIG. 7 is a flowchart showing an example of the operation of the access terminal when employing Communication manner 1.
Figure 9:
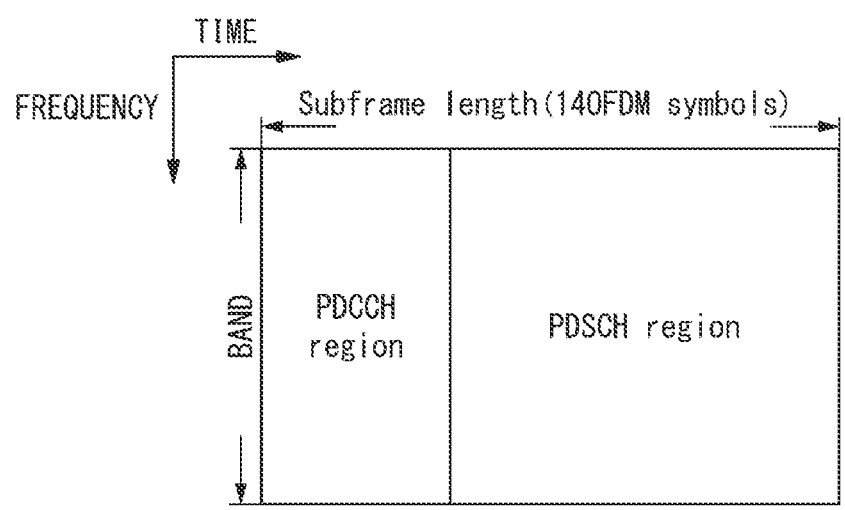
FIG. 9 is a schematic diagram showing time-division multiplexed PDCCH and PDSCH in a conventional technique.
Figure 10:
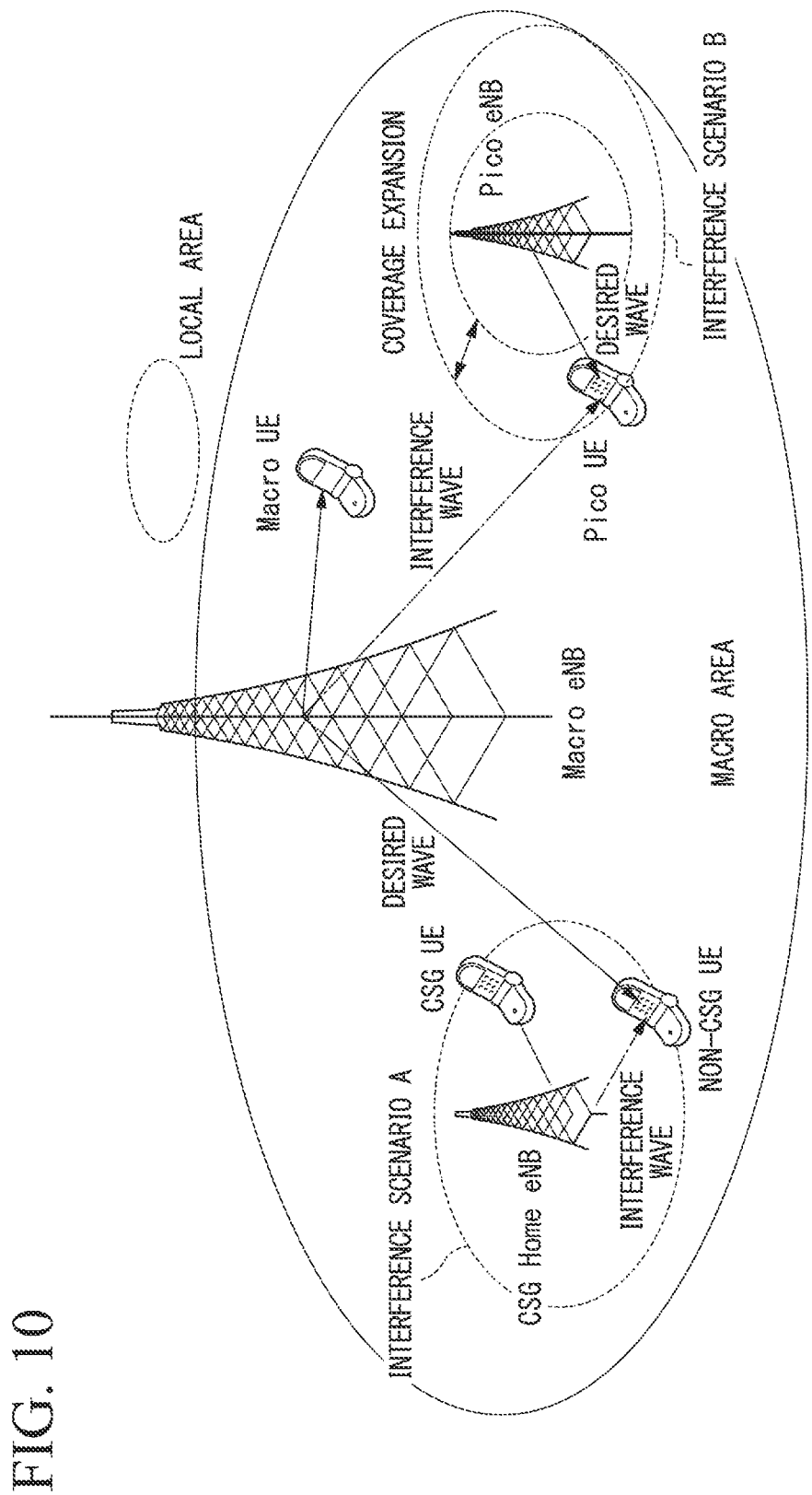
FIG. 10 is a diagram showing an example of the structure of a heterogeneous radio access network in a conventional technique.

FIG. 7 is a flowchart showing an example of the operation of the access terminal when employing Communication manner 1. More specifically, the flowchart of FIG. 7 shows (i) an operation (in case of the interference scenario A) of the access terminal (CSG UE) that accesses the base station apparatus 10 (CSG Home eNB) employing Communication manner 1, or (ii) an operation (in case of the interference scenario B) of the access terminal (Macro UE) that accesses the base station apparatus 10 (Macro eNB) employing Communication manner 1. These conditions are similarly applied to flowcharts 8A and 8B explained later.

In FIG. 7, the access terminal which received a subframe determines whether or not allocation information (for the subframe), which is referred to when performing continuous transmission by the continuous transmission scheduling, has been stored (see step S100).

When performing PDSCH reception and PUSCH transmission in accordance with the continuous transmission scheduling that performs the scheduling periodically based on the period (P), the access terminal stores P allocation information items assigned to P continuous subframes from subframe n for which allocation information has been received, where the allocation information items assigned to P−1 subframes from subframe n+1 to subframe n+P−1 are each the same as the allocation information for subframe n.

If it is determined in step S100 that no allocation information has been stored (see step S100: No), the access terminal then determines whether or not allocation information for PDSCH/PUSCH addressed to the present terminal is present in the relevant subframe (see step S110). That is, the access terminal determines whether or not "PCFICH reception→PDCCH reception" could be executed in the relevant subframe. If the base station apparatus 10 is performing the dynamic scheduling, there are allocation information items in respective subframes. In contrast, if the base station apparatus 10 is performing the continuous transmission scheduling that performs the scheduling periodically based on the period ($P_K$), subframes appearing periodically based on the period ($P_K$) (e.g., subframe n, subframe n+$P_K$, . . . ) each contain allocation information, while subframes (e.g., subframe n+1, subframe n+2, . . . , subframe n+$P_K$−1) interposed by these subframes each contain no allocation information.

If it is determined in step S110 that the relevant allocation information is present (see step S110: Yes), PDSCH reception and PUSCH transmission are performed using the relevant allocation information (see step S120 performed by a transmission and reception device).

After performing step S120, the access terminal determines whether or not the continuous transmission scheduler is employed based on the continuous transmission application ON/OFF information contained in PDCCH (see step S130 performed by an application ON/OFF determination device). More specifically, the access terminal determines whether or not the value of bit_continuousTransmissionScheduling is 1. That is, the access terminal determines whether or not the terminal will obey the continuous transmission scheduling for the next subframe and thereafter.

If it is determined in step S130 that the continuous transmission scheduler is employed (see step S130: Yes), the access terminal stores the allocation information used in the above step S120 (see step S140). That is, since the access terminal has determined that the terminal obeys the continuous transmission scheduling for the next subframe and thereafter, the access terminal stores the period (P) of the continuous transmission scheduling and the allocation information used in step S120 as P−1 allocation information items assigned to P−1 respective subframes from the next subframe so as to perform the continuous transmission according to the continuous transmission scheduling. The operation of the flowchart in FIG. 7 is then completed (and returns to step S100 so as to process the next subframe).

In contrast, if it is determined in step S110 that the relevant allocation information is not present (see step S110: No), or if it is determined in step S130 that the continuous transmission scheduler is not employed (see step S130: No), the operation of the flowchart in FIG. 7 is terminated (and returns to step S100 so as to process the next subframe).

Additionally, if it is determined in step S100 that allocation information has been stored (see step S100: Yes), the access terminal performs the PDSCH reception and the PUSCH transmission by using the stored allocation information (which is referred to when performing the continuous transmission for the relevant subframe according to the continuous transmission scheduling) (see step S150 performed by a transmission and reception device). That is, the access terminal executes the PDSCH reception and the PUSCH transmission without performing the PCFICH reception and the PDCCH reception. The operation of the flowchart in FIG. 7 is then completed (and returns to step S100 so as to process the next subframe).

As described above, while the access terminal performs the PDSCH reception and the PUSCH transmission based on the continuous transmission scheduling, PCFICH and PDCCH receptions are performed only periodically, so that the battery consumption is reduced. For example, in the interference scenario A, while the access terminal (CSG UE) performs the PDSCH reception and the PUSCH transmission based on the continuous transmission scheduling by the base station apparatus 10 (CSG Home eNB), the PCFICH and PDCCH receptions are performed only periodically, so that the battery consumption is reduced. In addition, in the interference scenario B, while the access terminal (Macro UE) performs the PDSCH reception and the PUSCH transmission based on the continuous transmission scheduling by the base station apparatus 10 (Macro eNB), the PCFICH and PDCCH receptions are performed only periodically, so that the battery consumption is reduced.

Additionally, while the continuous transmission scheduler mode is employed, the base station apparatus 10 does not transmit PCFICH and PDCCH, so that interference with respect to the control channel in the interference-receiving terminal is reduced, thereby improving the reception quality for the control channel at the interference-receiving terminal. For example, in the interference scenario A, while the continuous transmission scheduler mode is employed, the base station apparatus 10 (CSG Home eNB) does not transmit PCFICH and PDCCH, so that interference with respect to the control channel in the interference-receiving terminal (non-CSG UE) is reduced, thereby improving the reception quality for the control channel at the interference-receiving terminal (non-CSG UE). In addition, in the interference scenario B, while the continuous transmission scheduler mode is employed, the base station apparatus 10 (Macro eNB) does not transmit PCFICH and PDCCH, so that interference with respect to the control channel in the interference-receiving terminal (Pico UE) is reduced, thereby improving the reception quality for the control channel at the interference-receiving terminal (Pico UE).

Communication Manner 2

In this manner, a message including the continuous transmission application ON/OFF information and the continuous transmission period information is added (or defined) as a message (specifically called an "RRC (radio resource control) message") stored in a data region (PDSCH (region)/PUSCH (region)), so as to communicate the continuous transmission application ON/OFF information and the continuous transmission period information to the relevant terminal. Although the added message is called "CTS_Config", such a name is just an example, and another name may be employed. In addition, CTS_Config is a message used for configuring the continuous transmission scheduler mode. By defining CTS_Config, the continuous transmission application ON/OFF information and the continuous transmission period information can be communicated to each access terminal.

Below, the operation of the access terminal will be explained for Case 1 of receiving CTS_Config during the dynamic scheduler mode (i.e., while performing the PDSCH reception and PUSCH transmission based on the dynamic scheduling), and Case 2 of receiving CTS_Config during the continuous transmission scheduler mode (i.e., while performing the PDSCH reception and PUSCH transmission based on the continuous transmission scheduling).

Communication Manner 2: Case 1

When receiving CTS_Config during the dynamic scheduler mode, the access terminal refers to the continuous transmission application ON/OFF information in CTS_Config. If the continuous transmission application ON/OFF information indicates that the continuous transmission scheduler mode is employed, the access terminal obtains the period (P) based on the continuous transmission period information in CTS_Config, and performs the PDSCH reception and PUSCH transmission at P continuous subframes from subframe n (for which allocation information has been received), by using the allocation information assigned to the subframe n. That is, the PDSCH reception and PUSCH transmission are executed according to the continuous transmission scheduling that performs the relevant scheduling periodically based on the period (P).

In other words, when receiving CTS_Config that contains the continuous transmission application ON/OFF information (which indicates that the continuous transmission scheduler mode is employed) and the continuous transmission period information (which indicates the period ($P_K$)), the access terminal determines that the scheduler mode has been switched from the dynamic scheduler mode to the continuous transmission scheduler mode. Therefore, for subframes from the first subframe for which PDCCH was received first after receiving CTS_Config, the access terminal performs the PDSCH reception and PUSCH transmission according to the continuous transmission scheduling using the period ($P_K$). That is, if it is defined that subframe x is the first subframe for which PDCCH was received first after CTS_Config was received and the scheduler mode is switched from the dynamic scheduler mode to the continuous transmission scheduler mode, then the allocation information obtained by the subframe x is applied to P continuous subframes (i.e., the relevant subframe x and subframes x+1 to x+$P_K$−1) so as to perform the PDSCH reception and PUSCH transmission. Here, the subframe used for receiving CTS_Config may be regarded as the first subframe for which PDCCH was received first after CTS_Config was received.

In contrast, if the continuous transmission application ON/OFF information indicates that the continuous transmission scheduler mode is not employed, the PDSCH reception and PUSCH transmission according to the dynamic scheduling is maintained.

Communication Manner 2: Case 2

When receiving CTS_Config during the continuous transmission scheduler mode, the access terminal refers to the continuous transmission application ON/OFF information in CTS_Config. If the continuous transmission application ON/OFF information indicates that the continuous transmission scheduler mode is not employed, the access terminal determines that the scheduler mode has been switched from the continuous transmission scheduler mode to the dynamic scheduler mode, and then performs the PDSCH reception and PUSCH transmission according to the dynamic scheduling.

In contrast, if the continuous transmission application ON/OFF information indicates that the continuous transmission scheduler mode is employed, the access terminal obtains the period (P) based on the continuous transmission period information in CTS_Config, and performs the PDSCH reception and PUSCH transmission according to the continuous transmission scheduling that performs the scheduling periodically based on the period (P).

That is, if the access terminal receives CTS_Config that contains the continuous transmission application ON/OFF information (which indicates that the continuous transmission scheduler mode is employed) and the continuous transmission period information (which indicates the period ($P_1$)) while performing the PDSCH reception and PUSCH transmission according to the continuous transmission scheduling based on the period ($P_1$), then the access terminal maintains the PDSCH reception and PUSCH transmission according to the continuous transmission scheduling based on the period ($P_1$).

In addition, if the access terminal receives CTS_Config that contains the continuous transmission application ON/OFF information (which indicates that the continuous transmission scheduler mode is employed) and the continuous transmission period information (which indicates the period ($P_2$)) while performing the PDSCH reception and PUSCH transmission according to the continuous transmission scheduling based on the period ($P_1$), then the access terminal applies the PDSCH reception and PUSCH transmission according to the continuous transmission scheduling based on the period ($P_2$) to subframes from the first subframe for which PDCCH was received first after receiving CTS_Config, that is, the period (P) is switched from $P_1$ to $P_2$.

In Communication manner 2, the data channel generation unit 166 which generates a data channel or an output unit (not shown) corresponds to a terminal communication device that communicates the continuous transmission application ON/OFF information and the continuous transmission period information to the relevant terminal by using an RRC (radio resource control) message which contains the continuous transmission application ON/OFF information and the continuous transmission period information.

Below, the operation of the access terminal when employing Communication manner 2 will be explained.

FIGS. 8A and 8B are flowcharts showing an example of the operation of the access terminal when employing Communication manner 2. More specifically, the flowchart of FIG. 8A shows an operation during the dynamic scheduler mode (when no allocation information is stored), and the flowchart of FIG. 8B shows an operation during the continuous transmission scheduler mode (when no allocation information is stored). Additionally, in FIG. 8A, it is defined that the subframe by which CTS_Config is received coincides with the first subframe for which. PDCCF is received first after receiving CTS_Config.

In FIG. 8A, the access terminal performs the PDSCH reception and PUSCH transmission by using the allocation information received by the relevant subframe (see step S300 performed by a transmission and reception device). That is, the access terminal performs the PCFICH reception and the PDCCH reception, and then performs the PDSCH reception and the PUSCH transmission.

Following to the above step S300, the access terminal determines whether or not CTS_Config was received at the relevant subframe (see step S310 performed by a reception determination device). If the access terminal determines that no CTS_Config was received (see step S310: No), the flowchart of FIG. 8A is terminated.

In contrast, if the access terminal determines in step S310 that CTS_Config was received (see step S310: Yes), the access terminal then determines whether or not the continuous transmission application ON/OFF information indicates that the continuous transmission scheduler mode is employed (see step S320 performed by an application ON/OFF determination device). If the access terminal determines that the continuous transmission application ON/OFF information indicates that the continuous transmission scheduler mode is not employed (see step S320: No), the flowchart of FIG. 8A is terminated.

In contrast, if the access terminal determines that the continuous transmission application ON/OFF information indicates that the continuous transmission scheduler mode is employed (see step S320: Yes), the access terminal stores the allocation information of the relevant subframe as allocation information to be referred to when performing the continuous transmission according to the continuous transmission scheduling (see step S330). Here, although the access terminal originally stores allocation information contained in the first subframe for which PDCCH was received first after receiving the relevant CTS_Config, it is assumed (as described above) that the subframe by which CTS_Config is received coincides with the first subframe for which PDCCF is received first after receiving CTS_Config, and thus the access terminal stores the allocation information of the relevant subframe. The operation of the flowchart in FIG. 8A is then completed.

In FIG. 8B, the access terminal performs the PDSCH reception and PUSCH transmission by using allocation information, which has been stored as allocation information to be referred to when performing the continuous transmission according to the continuous transmission scheduling (see step S400 performed by a transmission and reception device). That is, the access terminal performs the PDSCH reception and PUSCH transmission without performing the PCFICH reception and the PDCCH reception.

Following to the above step S400, the access terminal determines whether or not CTS_Config was received at the relevant subframe (see step S410 performed by a reception determination device). If the access terminal determines that no CTS_Config was received (see step S410: No), the flowchart of FIG. 8B is terminated.

In contrast, if the access terminal determines in step S410 that CTS_Config was received (see step S410: Yes), the access terminal then determines whether or not the continuous transmission application ON/OFF information indicates that the continuous transmission scheduler mode is employed (see step S420 performed by an application ON/OFF determination device). If the access terminal determines that the continuous transmission application ON/OFF information indicates that the continuous transmission scheduler mode is employed (see step S420: Yes), the access terminal stores the allocation information of the relevant subframe as allocation information to be referred to when performing the continuous transmission according to the continuous transmission scheduling (see step S430). Here, although the access terminal originally stores allocation information contained in the first subframe for which PDCCH was received first after receiving the relevant CTS_Config, it is assumed (as described above) that the subframe by which CTS_Config is received coincides with the first subframe for which PDCCF is received first after receiving CTS_Config, and thus the access terminal stores the allocation information of the relevant subframe. The operation of the flowchart in FIG. 8B is then completed.

In contrast, if the access terminal determines in step S420 that the continuous transmission application ON/OFF information indicates that the continuous transmission scheduler mode is not employed (see step S420: No), that is, if the access terminal determines that the scheduler mode is switched from the continuous transmission scheduler mode to the dynamic scheduler mode, then the access terminal deletes the allocation information which has been stored as the allocation information to be referred to when performing the continuous transmission according to the continuous transmission scheduling (see step S440). The operation of the flowchart in FIG. 8B is then completed.

Similar to Communication manner 1, in Communication manner 2 as shown in FIGS. 8A and 8B, while the access terminal performs the PDSCH reception and the PUSCH transmission based on the continuous transmission scheduling, PCFICH and PDCCH receptions are performed only periodically, so that the battery consumption is reduced. Also additionally, while the continuous transmission scheduler mode is employed, the base station apparatus 10 does not transmit PCFICH and PDCCH, so that interference with respect to the control channel in the interference-receiving terminal is reduced, thereby improving the reception quality for the control channel at the interference-receiving terminal.

Communication Manner 3

In this manner, parameter setting information including the continuous transmission application ON/OFF information and the continuous transmission period information is added (or defined) as parameter setting information (specifically called "SIB (system information broadcast) information") stored in a data region (PDSCH (region)/PUSCH (region)), so as to communicate the continuous transmission application ON/OFF information and the continuous transmission period information to the relevant terminal.

The SIB information is one of the RRC messages, and parameter setting information commonly used in the relevant system. By defining the SIB Information which includes the continuous transmission application ON/OFF information and the continuous transmission period information, these information items can be communicated to a plurality of access terminals.

Below, the operation of the access terminal will be explained for Case 1 of receiving the SIB Information during the dynamic scheduler mode, and Case 2 of receiving the SIB Information during the continuous transmission scheduler mode.

Communication Manner 3: Case 1

When receiving the SIB information during the dynamic scheduler mode, the access terminal refers to the continuous transmission application ON/OFF information in the SIB information. If the continuous transmission application ON/OFF information indicates that the continuous transmission scheduler mode is employed, the access terminal obtains the period (P) based on the continuous transmission period information in the SIB information, and performs the PDSCH reception and PUSCH transmission according to the continuous transmission scheduling that performs the scheduling periodically based on the period (P). That is, when receiving the SIB information that contains the continuous transmission application ON/OFF information (which indicates that the continuous transmission scheduler mode is employed) and the continuous transmission period information (which indicates the period (e.g., $P_K$)), the access terminal determines that the scheduler mode has been switched from the dynamic scheduler mode to the continuous transmission scheduler mode. Therefore, for the following subframes, the access terminal performs the PDSCH reception and PUSCH transmission according to the continuous transmission scheduling using the period ($P_K$).

In contrast, if the continuous transmission application ON/OFF information indicates that the continuous transmission scheduler mode is not employed, the PDSCH reception and PUSCH transmission according to the dynamic scheduling is maintained.

Communication Manner 3: Case 2

When receiving the SIB information during the continuous transmission scheduler mode, the access terminal refers to the continuous transmission application. ON/OFF information in the SIB information. If the continuous transmission application ON/OFF information indicates that the continuous transmission scheduler mode is not employed, the access terminal determines that the scheduler mode has been switched from the continuous transmission scheduler mode to the dynamic scheduler mode, and then performs the PDSCH reception and PUSCH transmission according to the dynamic scheduling.

In contrast, if the continuous transmission application ON/OFF information indicates that the continuous transmission scheduler mode is employed, the access terminal obtains the period (P) based on the continuous transmission period information in the SIB information, and performs the PDSCH reception and PUSCH transmission according to the continuous transmission scheduling that performs the scheduling periodically based on the period (P). That is, if the access terminal receives the SIB information that contains the continuous transmission application ON/OFF information (which indicates that the continuous transmission scheduler mode is employed) and the continuous transmission period information (which indicates the period (e.g., $P_1$)) while performing the PDSCH reception and PUSCH transmission according to the continuous transmission scheduling based on the period ($P_1$), then the access terminal maintains the PDSCH reception and PUSCH transmission according to the continuous transmission scheduling based on the period ($P_1$). In addition, if the access terminal receives the SIB information that contains the continuous transmission application ON/OFF information (which indicates that the continuous transmission scheduler mode is employed) and the continuous transmission period information (which indicates the period (e.g., $P_2$)) while performing the PDSCH reception and PUSCH transmission according to the continuous transmission scheduling based on the period ($P_1$), then the access terminal applies the PDSCH reception and PUSCH transmission according to the continuous transmission scheduling based on the period ($P_2$) to subframes from the first subframe for which PDCCH was received first after receiving the SIB information, that is, the period (P) is switched from $P_j$ to $P_2$.

As described above, although the information which contains the continuous transmission application ON/OFF information and the continuous transmission period information is different between Communication manner 2 and Communication manner 3, the operation of the access terminal is common between these manners. Therefore, detailed explanations (including those using a flowchart) of the operation of the access terminal in Communication manner 3 are omitted.

In Communication manner 3, the data channel generation unit 166 which generates a data channel or an output unit (not shown) corresponds to a terminal communication device that communicates the continuous transmission application ON/OFF information and the continuous transmission period information to the relevant terminal by using SIB (system information broadcast) information which contains the continuous transmission application ON/OFF information and the continuous transmission period information.

Similar to Communication manners 1 and 2, in Communication manner 3, while the access terminal performs the PDSCH reception and the PUSCH transmission based on the continuous transmission scheduling, PCFICH and PDCCH receptions are performed only periodically, so that the battery consumption is reduced. Also additionally, while the continuous transmission scheduler mode is employed, the base station apparatus 10 does not transmit PCFICH and PDCCH, so that interference with respect to the control channel in the interference-receiving terminal is reduced, thereby improving the reception quality for the control channel at the interference-receiving terminal.

As described above, in accordance with the base station apparatus 10 of the present embodiment, it is possible to improve the reception quality of the control channel at the interference-receiving terminal, and to reduce the battery consumption of the interference-receiving terminal.

For example, in case of the interference scenario A, when an interference-receiving terminal (non-CSG UE) is present in the coverage area of the base station apparatus 10 (CSG Home eNB), the base station apparatus 10 performs communication with an access terminal (CSG UE) by using the continuous transmission scheduler mode. Therefore, it is possible to improve the reception quality of the control channel (from a macro base station) at the interference-receiving terminal (non-CSG UE). In addition, since the access terminal (CSG UE) performs the PCFICH reception and the PDCCH reception at each subframe appearing periodically based on the period P, the battery consumption is reduced in comparison with a case of performing the PCFICH reception and the PDCCH at every subframe.

Additionally, in case of the interference scenario B, when an interference-receiving terminal (Pico UE) is present in the expanded coverage area of the Pico eNB, the base station apparatus 10 (Macro eNB) performs communication with an access terminal (Macro UE) by using the continuous transmission scheduler mode. Therefore, it is possible to improve the reception quality of the control channel (from the Pico eNB) at the interference-receiving terminal (Pico UE). In addition, since the access terminal (Macro UE) performs the PCFICH reception and the PDCCH reception at each subframe appearing periodically based on the period P, the battery consumption is reduced in comparison with a case of performing the PCFICH reception and the PDCCH at every subframe.

In the above-described embodiment, the base station apparatus 10 informs the access terminal of the continuous transmission application ON/OFF information and the continuous transmission period information. Instead thereof, the base station apparatus 10 may inform the access terminal only of the continuous transmission period information, where if the period indicated by the continuous transmission period information is zero, the base station apparatus 10 determines that the continuous transmission scheduler is not employed (i.e., OFF). For example, in case of the above-described Communication manner 1, the base station apparatus 10 may secure only a few bits of bits_P in PDCCH (region) instead of securing one bit of bit_continuousTransmissionScheduling and a few bits of bits_P, thereby reducing one bit to be secured in the PDCCH (region).

In case of the interference scenario B in the above-described embodiment, when employing the continuous transmission scheduler mode, the base station apparatus 10 (Macro eNB) informs the access terminal (Macro UE) of the continuous transmission application ON/OFF information and the continuous transmission period information. Instead thereof, the base station apparatus 10 may communicates the continuous transmission application ON/OFF information and the continuous transmission period information, to not only the access terminal (Macro UE), but also the base station (Pico eNB) which the interference-receiving terminal (Pico UE) accesses.

For example, the base station apparatus 10 (Macro eNB) may inform the base station (Pico eNB) of the continuous transmission application ON/OFF information and the continuous transmission period information by using an X2 interface. Accordingly, the relevant base station (Pico eNB) can also refer to the continuous transmission application ON/OFF information and the continuous transmission period information communicated by the base station apparatus 10 (Macro eNB) so as to perform the scheduling for the target terminal (Pico UE) in a manner which reduces the relevant interference. For example, in order to prevent the interference by the base station apparatus 10 (Macro eNB), the base station (Pico eNB) may apply a continuous transmission scheduler mode, which has a period that does not overlap with the period P assigned to the base station apparatus 10 (Macro eNB), to a terminal (Pico UE) which is present in the relevant expanded coverage area.

Additionally, in the above-described embodiment, when the base station apparatus 10 determines, based on the detection result from the detection unit 110, that the interference in the interference-receiving terminal is a problem, the base station apparatus 10 switches the scheduler mode from the dynamic scheduler mode to the continuous transmission scheduler mode. However, also when determining that the interference in the interference-receiving terminal causes no problem, the base station apparatus 10 may set the scheduler mode to the continuous transmission scheduler mode. In other words, the base station apparatus 10 may always employ the continuous transmission scheduler mode.

That is, in the interference scenario A, even when no interference-receiving terminal (non-CSG UE) is present in the coverage area of the present base station 10 (CSG Home eNB), the base station apparatus 10 (CSG Home eNB) may set the scheduler mode to the continuous transmission scheduler mode. In addition, in the interference scenario B, even when no interference-receiving terminal (Pico UE) is present in the expanded coverage area of Pico eNB, the base station apparatus 10 (Macro eNB) may set the scheduler mode to the continuous transmission scheduler mode.

In such a manner of always employing the continuous transmission scheduler mode (i.e., employed even when the interference in the interference-receiving terminal causes no problem):

(i) the battery consumption in the access terminal can be reduced when the interference in the interference-receiving terminal causes no problem, that is, when no interference-receiving terminal (non-CSG UE) is present in the coverage area of the present base station 10 (CSG Home eNB) in the interference scenario A, or no interference-receiving terminal (Pico UE) is present in the expanded coverage area of Pico eNB in the interference scenario B; and (ii) the reception quality for the control channel at the interference-receiving terminal can be improved and the battery consumption in the access terminal can be reduced when the interference in the interference-receiving terminal causes a problem, that is, when an interference-receiving terminal (non-CSG UE) is present in the coverage area of the present base station 10 (CSG Home eNB) in the interference scenario A, or an interference-receiving terminal (Pico UE) is present in the expanded coverage area of Pico eNB in the interference scenario B.

Additionally, in the manner of always employing the continuous transmission scheduler mode, it is unnecessary for the base station apparatus 10 to have a detection unit 110. Regarding the communication manner for this case, it is unnecessary to communicate the continuous transmission application ON/OFF information, where communication of the continuous transmission period information is also unnecessary if the period P is fixed.

A program for implementing the operation of the base station apparatus 10 (as an embodiment of the present invention) and a program for implementing the operation of the access terminal (as an embodiment of the present invention) may each be stored in a computer readable storage medium, and the program stored in the storage medium may be loaded and executed on a computer system so as to implement various steps executed in the operations of the base station apparatus 10 and the access terminal. Here, the computer system may have hardware resources which include an OS, peripheral devices, and the like.

If the computer system employs a WWW system, the computer system can provide a homepage viewable environment.

The above computer readable storage medium is a storage device, for example, a portable medium such as a flexible disk, a magneto optical disk, a ROM, electrically writable nonvolatile memory (e.g., flash memory), or a CD-ROM, or a memory device such as a hard disk built in a computer system.

The computer readable storage medium also includes a device for temporarily storing the program, such as a volatile storage medium (e.g. DRAM (Dynamic Random Access Memory)) in a computer system which functions as a server or client and receives the program via a network (e.g., the Internet) or a communication line (e.g., a telephone line).

The above program, stored in a memory device of a computer system, may be transmitted via a transmission medium or by using transmitted waves passing through a transmission medium to another computer system. The transmission medium for transmitting the program has a function of transmitting data, and is, for example, a (communication) network such as the Internet or a communication line such as a telephone line.

In addition, the program may execute a part of the above-explained functions.

The program may also be a "differential" program so that the above-described functions can be executed by a combination program of the differential program and an existing program which has already been stored in the relevant computer.

While preferred embodiments of the present invention have been described and illustrated above, it should be understood that these are exemplary embodiments of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A base station apparatus that employs a dynamic scheduler mode which performs wireless resource allocation for each subframe and applies a result of the allocation to the corresponding subframe, and a continuous transmission scheduler mode which performs wireless resource allocation for each subframe appearing periodically based on a period P and applies a result of the allocation for the relevant subframe to P continuous subframes from a subframe n to a subframe n+P−1, wherein the base station apparatus comprises:
   a terminal communication device that communicates continuous transmission application ON/OFF information, which indicates whether or not the continuous transmission scheduler mode is employed, and continuous transmission period information, which indicates a period of continuous transmission scheduling according to the continuous transmission scheduler mode, to a terminal;
   a detection device that determines whether or not there is an interference-receiving terminal which is interfered by the present base station apparatus and is present in a predetermined coverage area; and
   a scheduler mode determination device that sets a scheduler mode to:
   the dynamic scheduler mode if there is no interference-receiving terminal in the coverage area; or
   the continuous transmission scheduler mode if there is the interference-receiving terminal in the coverage area.

2. The base station apparatus in accordance with claim 1, wherein the terminal communication device stores the continuous transmission application ON/OFF information and the continuous transmission period information in a PDCCH region, and communicates these information items to the terminal.

3. The base station apparatus in accordance with claim 1, wherein the terminal communication device communicates the continuous transmission application ON/OFF information and the continuous transmission period information to the terminal by using an RRC (radio resource control) message which contains these information items.

4. The base station apparatus in accordance with claim 1, wherein the terminal communication device communicates the continuous transmission application ON/OFF information and the continuous transmission period information to the terminal by using SIB (system information broadcast) information which contains the continuous transmission application ON/OFF information and the continuous transmission period information.

5. The base station apparatus in accordance with claim 1, further comprising:
   a local base station communication device that communicates the continuous transmission application ON/OFF information and the continuous transmission period information to a local base station which is present in a coverage area of the present base station apparatus, by using an X2 interface.

6. A communication terminal that communicates with the base station apparatus in accordance with claim 1, wherein the communication terminal comprises:
   an application ON/OFF determination device that determines whether or not the continuous transmission scheduler mode is employed, based on the continuous transmission application ON/OFF information which is contained in a PDCCH region; and
   a transmission and reception device wherein if it is determined that the continuous transmission scheduler mode is employed, the transmission and reception device:
   obtains a period P indicated by the continuous transmission period information which is contained in the PDCCH region; and
   performs reception of a PDSCH and transmission of a PUSCH for the P continuous subframes from the subframe n by using allocation information assigned to the subframe n, where reception of the PDCCH is performed using the subframe n.

7. A communication terminal that communicates with the base station apparatus in accordance with claim 1, wherein the communication terminal comprises:
   a reception determination device that determines whether or not an RRC (radio resource control) message has been received, where the RRC message contains the continuous transmission application ON/OFF information, and the continuous transmission period information which indicates a period P of the continuous transmission scheduling;
   an application ON/OFF determination device wherein if it is determined that the RRC message has been received, the application ON/OFF determination device determines whether or not the continuous transmission scheduler mode is employed, based on the continuous transmission application ON/OFF information contained in the RRC message; and
   a transmission and reception device wherein if it is determined that the continuous transmission scheduler mode is employed, the transmission and reception device:
   obtains the period P indicated by the continuous transmission period information which contained in the RRC message; and
   performs reception of a PDSCH and transmission of a PUSCH for the P continuous subframes from the subframe n by using allocation information about wireless resource allocation which has been received and assigned to the subframe n.

8. A communication terminal that communicates with the base station apparatus in accordance with claim 1, wherein the communication terminal comprises:
   an application ON/OFF determination device that determines whether or not the continuous transmission scheduler mode is employed, based on the continuous transmission application ON/OFF information which is contained in SIB (system information broadcast) information; and
   a transmission and reception device wherein if it is determined that the continuous transmission scheduler mode is employed, the transmission and reception device:
   obtains a period P indicated by the continuous transmission period information which is contained in the SIB information; and
   performs reception of a PDSCH and transmission of a PUSCH for the P continuous subframes from the subframe n by using allocation information about wireless resource allocation which has been received and assigned to the subframe n.

* * * * *